US 6,697,563 B1

(12) United States Patent
Komoda et al.

(10) Patent No.: US 6,697,563 B1
(45) Date of Patent: Feb. 24, 2004

(54) INFORMATION RECORDING MEDIUM, MOTION-PICTURE VOICE RECORDING/REPRODUCING APPARATUS, AND MOTION-PICTURE VOICE RECORDING/REPRODUCING METHOD

(75) Inventors: Osamu Komoda, Yokohama (JP); Tsukasa Hasegawa, Hiratsuka (JP); Tamotsu Ito, Ayase (JP); Masahiro Kageyama, Hachioji (JP); Shinichiro Fukushima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/427,628

(22) Filed: Oct. 27, 1999

(30) Foreign Application Priority Data

Oct. 28, 1998 (JP) .......................... 10-306644

(51) Int. Cl.[7] ................................ H04N 5/91
(52) U.S. Cl. .......................... 386/46; 386/95
(58) Field of Search .............. 386/95, 117, 46, 386/125; 348/207.99, 333.05, 462; H04N 5/91

(56) References Cited

U.S. PATENT DOCUMENTS

| 5,544,140 A | * | 8/1996 | Seagrave et al. ........ 369/59.21 |
| 5,757,465 A | | 5/1998 | Seagrave et al. |
| 6,078,726 A | * | 6/2000 | Gotoh et al. ................ 386/117 |
| 6,240,241 B1 | * | 5/2001 | Yuen ........................... 386/95 |

FOREIGN PATENT DOCUMENTS

| EP | 0 597 450 A2 | | 5/1994 | |
| EP | 597450 A2 | * | 5/1994 | .......... G11B/27/32 |
| EP | 0 731 469 A2 | | 9/1996 | |
| EP | 731469 A2 | * | 9/1996 | .......... G11B/27/32 |
| JP | 10233988 A | * | 9/1998 | .......... H04N/5/765 |
| WO | WO 98/39918 | | 9/1998 | |

* cited by examiner

*Primary Examiner*—Vincent Boccio
*Assistant Examiner*—James A. Fletcher
(74) *Attorney, Agent, or Firm*—Antonelli, Terry, Stout & Kraus, LLP

(57) ABSTRACT

A recording medium having a data management structure capable of efficiently determining whether or not an outline image representing the outline of an original image and character information representing additional contents are added, and an motion-picture voice recording/reproducing apparatus for improving a retrieving operation factor of the recorded original image by generating and outputting the outline image from the original image even when the outline image is not added. Recording position information of images representing an outline of motion-picture and a voice signal, recording position information of character information representing additional contents relating to the motion-picture and voice signals, and/or information representing that the images representing the outline or the character information is not set by a user or by a system, are recorded to, and reproduced from, the recording medium.

10 Claims, 5 Drawing Sheets

INFORMATION RECORDING MEDIUM, MOTION-PICTURE VOICE RECORDING/REPRODUCING APPARATUS, AND MOTION-PICTURE VOICE RECORDING/REPRODUCING METHOD

BACKGROUND OF THE INVENTION

This invention relates to an information recording medium for recording motion-picture voice information. More particularly, this invention relates to a recording medium having a data management structure for recording information:that is used to concisely confirm an outline of recorded motion-picture voice information and an additional content, and relates also to an motion-picture voice recording/reproducing apparatus and an motion-picture voice recording/reproducing method, having means for outputting this information on the basis of the data management structure and means for recording or reproducing the motion-picture voice information and the management information.

A known motion-picture voice recording/reproducing apparatus includes means for recording a still picture, that represents the outline of recorded original image data added to original image data, and for displaying the still picture, and this apparatus raises an alarm display when the still picture is not prepared. Such an apparatus is described, for example, in JP-A-10-233988.

SUMMARY OF THE INVENTION

In order to determine the presence/absence of the still picture, the prior art technology described above needs to read out the original image and the data file of the still picture added to the original image and to determine its presence/absence. When the still pictures for a plurality of original images are displayed in this case, for example, all the corresponding files must be read out for the determination and the processing time necessary for this determination is likely to get elongated. As to the determination of the presence/absence of character information representing the additional content, too, the original images and the data files of the character information added to the original image must be read out for the determination of the presence/absence of the character information. If the character information for a plurality of original images is displayed in this case, for example, all the corresponding files must be read out for the determination and the processing time for the determination is likely to get elongated similarly.

When the still picture is not added, a screen representing that the still picture is not prepared is displayed. However, it is not possible for a user to know which images are recorded after all. In other words, the improvement in the operation factor of retrieving the recorded original images has not yet been sufficient.

It is an object of the present invention to provide a recording medium that has a data management structure capable of eliminating the problems described above and determining efficiently whether or not a still picture representing the outline of an original image or character information representing additional contents are added, and to provide an motion-picture voice recording/reproducing apparatus that generates still pictures from the original image even when the still pictures are not added, outputs the still pictures and improves the operation factor of retrieving the original images that are recorded.

According to one aspect of the present invention, there is provided an information recording medium having motion-picture and voice signals recorded thereto after an encoding compression processing, wherein recording position information of the compression motion-picture voice data corresponding to an outline image representing the motion-picture and the voice signals is recorded, the recording position information functions also as non-set information representing that the outline image is not set by a user or by a system, and the recording position information is readably arranged in such a fashion as to correspond to reproduction of the motion-picture and the voice signals in each predetermined unit. The non-set information representing that the outline image is not set is recorded to the recording position information by a value that cannot be used as the recording position information of the compressed motion-picture voice data.

According to another aspect of the present invention, there is provided an motion-picture voice recording/reproducing apparatus which comprises means for generating an outline image by looking up recording position information of compressed motion-picture voice data corresponding to the outline image that represents the outline of the motion-picture and the voice signals, and control means for determining whether or not the recording position information is a value that cannot be used as the recording position information, and causing the outline image generation means to generate the outline image by regarding the information of the recording leading position of a predetermined unit of the compressed motion-picture: voice data, as the recording position information of the compressed motion-picture voice data corresponding to the outline image, when the recording position information is determined as the value that cannot be used as the recording position information.

According to still another aspect of the present invention, there is provided an motion-picture voice recording/reproducing method which comprises the steps of setting a value, that cannot be used as recording position information, as the recording position information of the compressed motion-picture voice data corresponding to the outline image representing the outline of the motion-picture and the voice signals, when a user does not designate the outline image at the time of recording, determining, at the time of reproduction, whether or not the recording position information of the compressed motion-picture voice data corresponding to the outline image is a value that cannot be used as the recording position information, and reading out the compressed motion-picture voice data at the recording leading position of a predetermined unit of the compressed motion-picture voice data, and generating the outline image when the recording position information is the value that cannot be used as the recording position information.

According to still another aspect of the present invention, there is provided an information recording medium having motion-picture and voice signals recorded thereto after an encoding compression processing, wherein the recording position information of character information representing an additional content relating to the motion-picture and to the voice signals is recorded thereto, the character information recording position information functions also as non-set information representing that the character information is not set by a user or by a system, and the character information recording position information is arranged readably in such a fashion as to correspond to reproduction of the motion-picture and the voice signals in each predetermined unit. The non-set information of the character information recording position information may be recorded by a value that cannot be used as the character information recording position information.

According to still another aspect of the present invention, there is further provided an motion-picture voice recording/reproducing apparatus which comprises character information generation means for reading out character information by looking up character information recording position information as recording position information of the character information representing an additional content relating to motion-picture and voice signals, and generating the character information, and control means for determining whether or not the character information recording position information is a value that cannot be used as the recording position information, and executing control in such a fashion as not to look for nor read the character information when the character information recording position information is the value that cannot be used as the recording position information.

According to still another aspect of the present invention, there is provided an motion-picture voice recording/reproducing method which comprises the steps of setting a value, that cannot be used as character information position information as recording position information of character information representing an additional content relating to the motion-picture and the voice signals when a user does not designate the character information at the time of recording, determining, at the time of reproduction, whether or not the character information recording position information is the value that cannot be used as the character information recording position information, and executing reproduction control in such a fashion as not to look for nor read the character information when the character information recording position information is the value that cannot be used as the character information recording position information.

DESCRIPTION OF THE EMBODIMENTS

Hereinafter, preferred embodiments of the present invention will be explained with reference to FIGS. 1 to 5.

Figure 1:
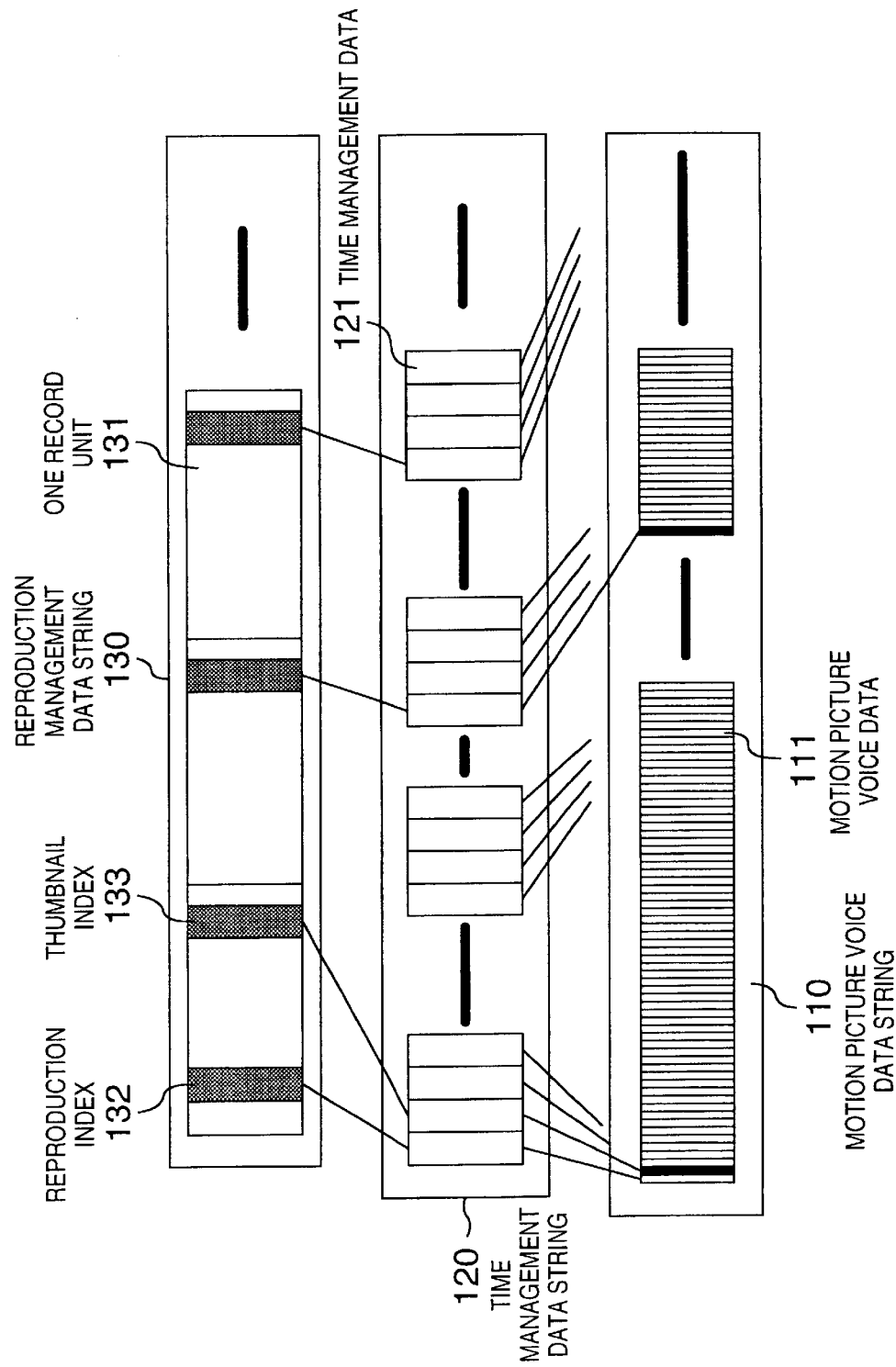
FIG. 1 shows a structure of motion-picture voice data recorded to a recording medium by an motion-picture voice recording/reproducing apparatus according to the present invention, and a structure of management data of the motion-picture voice data.

FIG. 1 shows a structure of motion-picture voice data recorded to a recording medium by an motion-picture voice recording/reproducing apparatus according to the present invention, and a structure of management data of the motion-picture voice data. Explanation will be given hereby on the data that is compressed by MPEG2 as the motion-picture voice data to be recorded.

In FIG. 1, reference numeral 110 denotes an motion-picture voice data string, and reference numeral 111 denotes motion-picture voice data acquired by dividing the motion-picture voice data string by an arbitrary reproduction time unit. The motion-picture voice data string 110 includes motion-picture data, voice data, and management information of the motion-picture data and the voice data that are recorded to the motion-picture voice data string 110 and information for decoding and reproducing the compressed data.

Reference numeral 120 denotes a time management data string for managing the correspondence between the reproduction time and the motion-picture voice data 111. Reference numeral 121 denotes time management data as one record unit of the time management data string. The motion-picture voice recording/reproducing apparatus according to the present invention specifies the motion-picture voice data 111 that is to be decoded, on the basis of the time management data 121, and decodes and reproduces the motion-picture voice data.

Reference numeral 130 denotes a reproduction management data string for managing the reproduction unit, and reference numeral 131 denotes one record unit of the reproduction management data string.

Here, the term "reproduction unit" includes those units which users can readily recognize, such as broadcasting programs, events recorded by cameras as typified by school sports, and so forth. It also includes a group of one or more recording units divided by the start of recording of the motion-picture voice recording/reproducing apparatus, its stop, turn-off of a power source, withdrawal of the recording medium, and so forth. In other words, the reproduction unit comprises one or a plurality of combinations of the motion-picture voice data 111. Moreover, the reproduction unit need not always be a continuous portion of the motion-picture voice data 111, but a combination of a plurality of random portions of the motion-picture voice data 111 may be the reproduction unit.

Reference numeral 132 denotes a reproduction index (reproducing/recording position information) for managing the correspondence between the reproduction unit and the time management data 121. This reproduction index is recorded to each reproduction management data region (white rectangular regions including 132 and 133 in the reproduction management data string 130). The motion-picture voice recording/reproducing apparatus according to the present invention specifies the range of the time management data 121 which relates to the reproduction unit from the reproduction index 132, and specifies also the range of the motion-picture voice data 111 that is to be decoded, on the basis of the time management data 121. Furthermore, it reads out the motion-picture voice data 111 and executes decoding and reproduction so that the reproduction unit designated by the user can be reproduced.

In the construction described above, one of the methods, that illustrates which relationship one time management data 121 has with which motion-picture voice data 111, demonstrates that this time management data 121 and the motion-picture voice data 111 correspond to each other if the recording leading address and the recording size of this data 111 are recorded to the time management data 121. This holds true also of the relationship between the time management data 121 and the motion-picture voice data 111 and the relationship between the reproduction index 132 and the time management data 121. It is also possible to employ the construction in which the recording position information of the leading data record (that represents the leading motion-picture voice data 111 when the motion-picture voice data 111 corresponding to a certain time management data 121 comprises a plurality of data in conjunction with the relationship between the time management data 121 and the motion-picture voice data 111, for example) and its record number (the number of constituent motion-picture voice data 111 in conjunction with the correspondence between the time management data 121 and the motion-picture voice data 111) are recorded as the management data. Furthermore, it is possible to employ the construction in which only the recording leading address or the recording position information of the leading data record is recorded. In this case, the correspondence can be determined from the recording leading address recorded to the object record or the recording position information of the leading data record recorded to the object index, and from the recording leading address recorded to the next record of the object record or the recording position information of the leading data record recorded to the next object index.

The time management data string 120 and the reproduction management data string 130 may be combined with information that identifies each data string, or with other information for recording and reproduction.

Reference numeral 133 denotes a thumbnail index (object image recording position information of the outline image) for recording the information that specifies the recording position of the object motion-picture data as the origin of the outline image (hereinafter referred to as the "thumbnail"), that represents the outline of the reproduction unit and may be a still picture or a dynamic image. In this embodiment, the thumbnail index 133 is assumed to record the recording position of the time management data 121. Though only one thumbnail index is shown disposed inside each reproduction management data in this embodiment, a plurality of thumbnail indices may be provided into each production management data. The motion-picture voice recording/reproducing apparatus according to the present invention specifies the motion-picture voice data 111 from the time management data 121 corresponding to the thumbnail index 133 and decodes the motion-picture data contained in this data. After decoding at least one reproduction frame, the motion-picture voice recording/reproducing apparatus displays the thumbnail by stopping the reproduction output while keeping the frame displayed. The thumbnail displayed at this time on the screen may be one, or a plurality of small screens may be displayed. When the dynamic image is displayed as the thumbnail, the still picture may be displayed after reproduction of the dynamic image, or reproduction of the dynamic image may be repeated.

As means for representing the state where the motion-picture data for displaying as the thumbnail is not specified, the present invention sets a value representing this state to the thumbnail index 133. The term "this state" may be the state where the user does not designate the thumbnail for the reproduction unit, or the state where this designation is released, or recording is effected by other motion-picture voice recording/reproducing apparatus not supporting the thumbnail display. This value may be not limited, in particular, so long as it cannot be used as the recording position of the time management data 121 in the index 133. For example, it may be "0hffffff".

Figure 2:
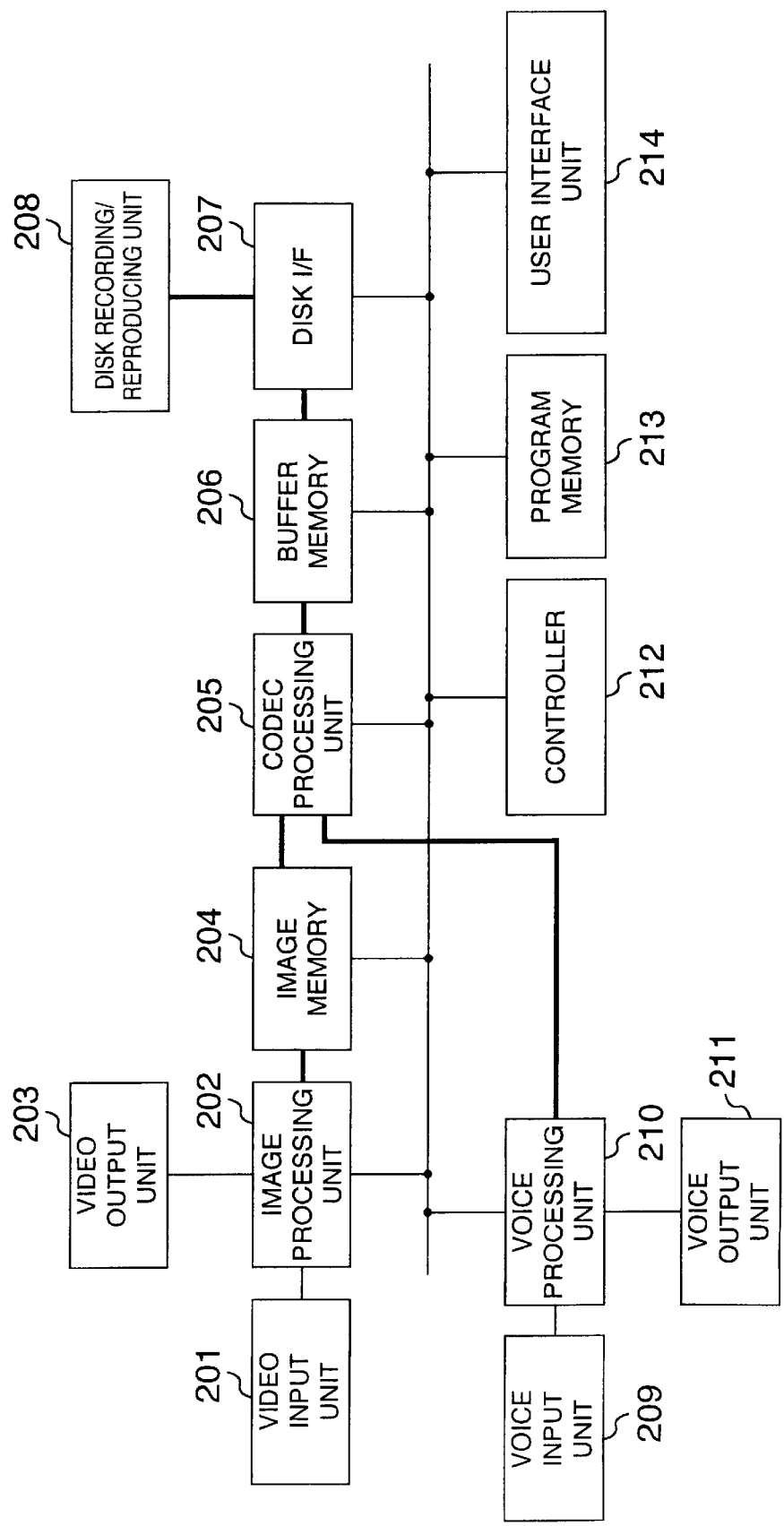
FIG. 2 is a structural block diagram of an motion-picture voice recording/reproducing apparatus according to the present invention.

Next, an motion-picture voice recording/reproducing apparatus for recording and reproducing motion-picture voice using the recording medium that records the content by the data structure described above will be explained with reference to FIG. 2. FIG. 2 is a structural block diagram of the motion-picture voice recording/reproducing apparatus of the present invention. In FIG. 2, a graphic signal is inputted to a graphic processing unit 202 through a graphic input unit 201 and is processed. The signal so processed is sent to a graphic output unit 203 and at the same time, is recorded in an image memory 204 so as to wait for compression encoding. Reference numeral 205 denotes encoding compression/extension means (hereinafter referred to as a "CODEC processing unit"). This unit reads out serially the graphic signals from the image memory 204 during compression encoding, executes a compression encoding process and records the signals after compression in a buffer memory 206 for recording. The signals recorded in the buffer memory 206 are sent to a disk recording/reproducing unit 208 through a disk I/F 207 and are recorded to a recording medium. The signals flow in the reverse direction during extension decoding, are extended and decoded to the image signals before compression by the CODEC processing unit 205, and are recorded to the image memory 204.

The graphic signals recorded to the image memory 204 are further modulated to carrier wave signals satisfying a predetermined standard (e.g. NTSC) in the graphic processing unit 202 and are sent to the graphic output unit 203. On the other hand, the voice is inputted to a voice processing unit 210 through a voice input unit 209. The signals so processed are sent to a voice output unit 211 and at the same time, are compression-encoded in the CODEC processing unit 205. Thereafter, these signals are recorded in the same way as the graphic signals. The CODEC processing unit 205 merges or divides both the graphic and voice compressed signals and executes encoding compression/extension of the graphic and voice signals, respectively. In this construction, a buffer for waiting for the transfer of the voice signals to the CODEC processing unit 205 may be disposed.

A controller 212 reads the program stored in a program memory 213, controls the block described above on the basis of the operation instruction from the user through a user interface unit 214, and reads and writes the data necessary for control from and to the program memory 213.

Figure 3:
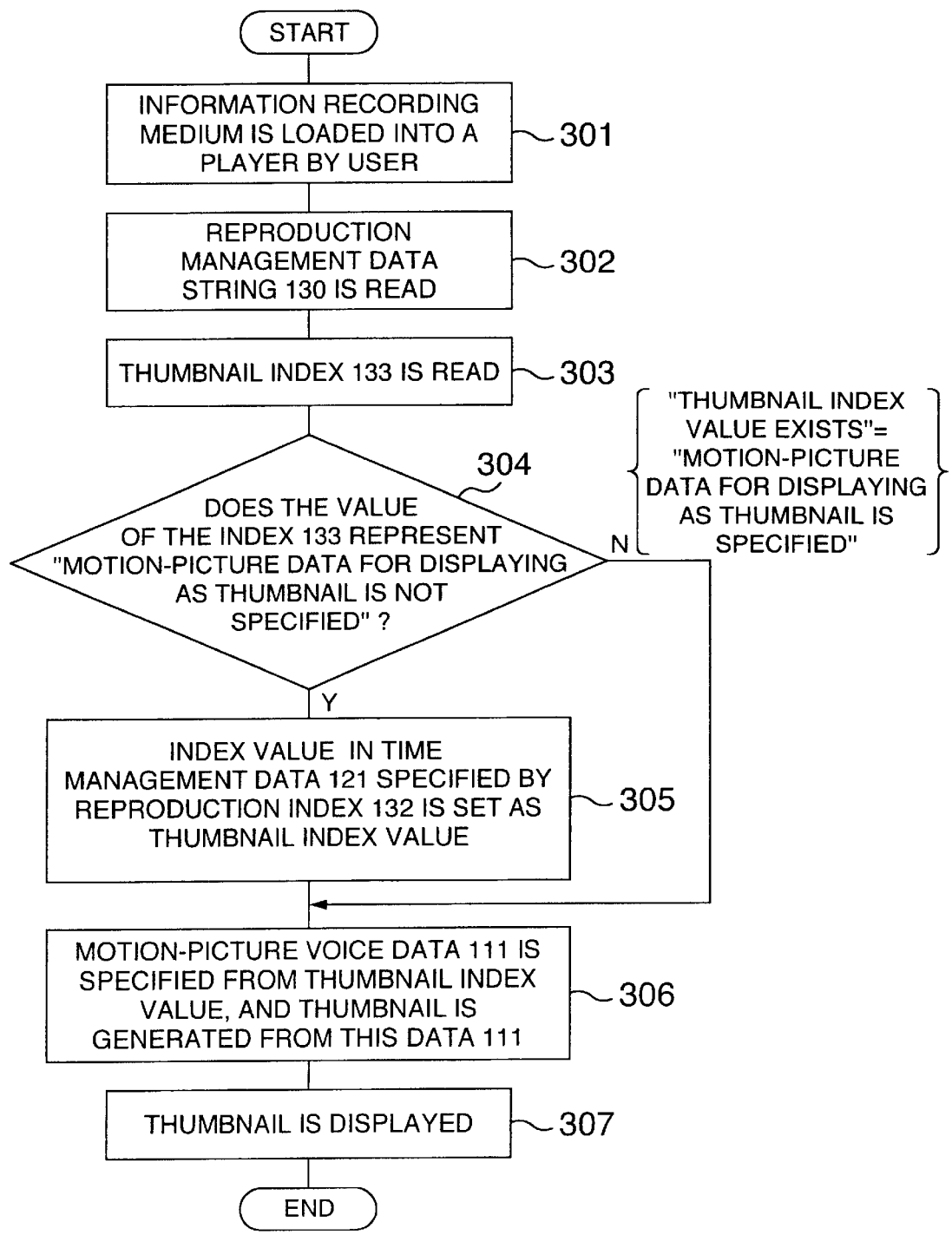
FIG. 3 is a processing flowchart showing an example of a thumbnail operation in the present invention.

Next, explanation will be given on the user's operation for executing the thumbnail display through the user interface unit 214 under the condition in which the motion-picture data for displaying as the thumbnail is not specified. Under this state, the value representing this state is recorded to the thumbnail index 133 as described above. When the motion-picture voice recording/reproducing apparatus of the present invention detects this value, it executes the thumbnail display using the index value of the leading data of the time management data 121, that is specified by the reproduction index 132, as the thumbnail index value. FIG. 3 shows an example of the processing flow. In step 304 of FIG. 3, whether or not the motion-picture data to be displayed as the thumbnail is specified is determined by determining whether or not the value of the thumbnail index 133 can be used as the recording position value. Incidentally, in the explanation given above, the thumbnail display is effected by using the index value of the leading data of the time management data 121, that is specified by the reproduction index 132, as the thumbnail index value. However, the motion-picture data after a passage of predetermined time from the leading data (the motion-picture data after the passage of 3 seconds, for example) may be displayed as the thumbnail image.

Figure 4:
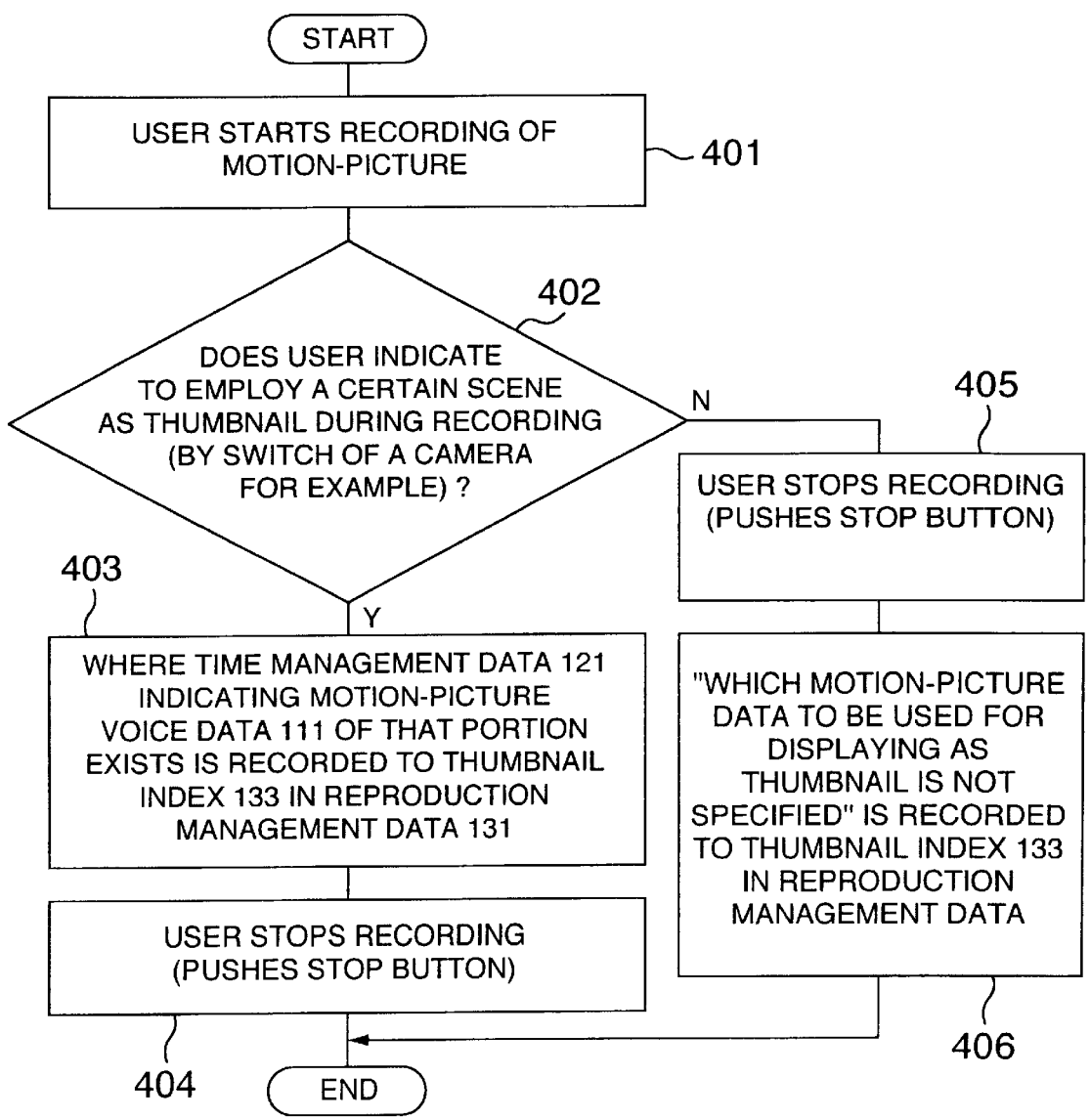
FIG. 4 is a process flowchart showing an example of the process flow when motion-picture voice is recorded in the present invention.

FIG. 4 shows an example of the processing flow when the motion-picture voice is recorded. When the user starts recording in step 401 and wants to employ a desired recording scene as the thumbnail in step 402, the user gives an instruction by a switch provided to a recorder (camera), for example. Then, at which position the time management data 121 indicating the motion-picture voice data 111 of that scene exists is recorded to the thumbnail index 133 in the reproduction management data 131 in step 403. When the user does not instruct the acceptance as the thumbnail in step 402 but stops the recording operation in step 405, a value that cannot be used as the recording position and represents "motion-picture data for displaying the thumbnail is not specified" is set to the thumbnail index 133 in the reproduction management data 131, in step 406.

Incidentally, after the thumbnail is displayed by using the index value of the leading data of the time management data 121 as described above, the thumbnail index value may be recorded to the thumbnail index 133.

A screen reporting to the user that the thumbnail display cannot be made may be displayed on the screen without executing the thumbnail display processing if the motion-picture data for displaying as the thumbnail is not specified.

Figure 5:
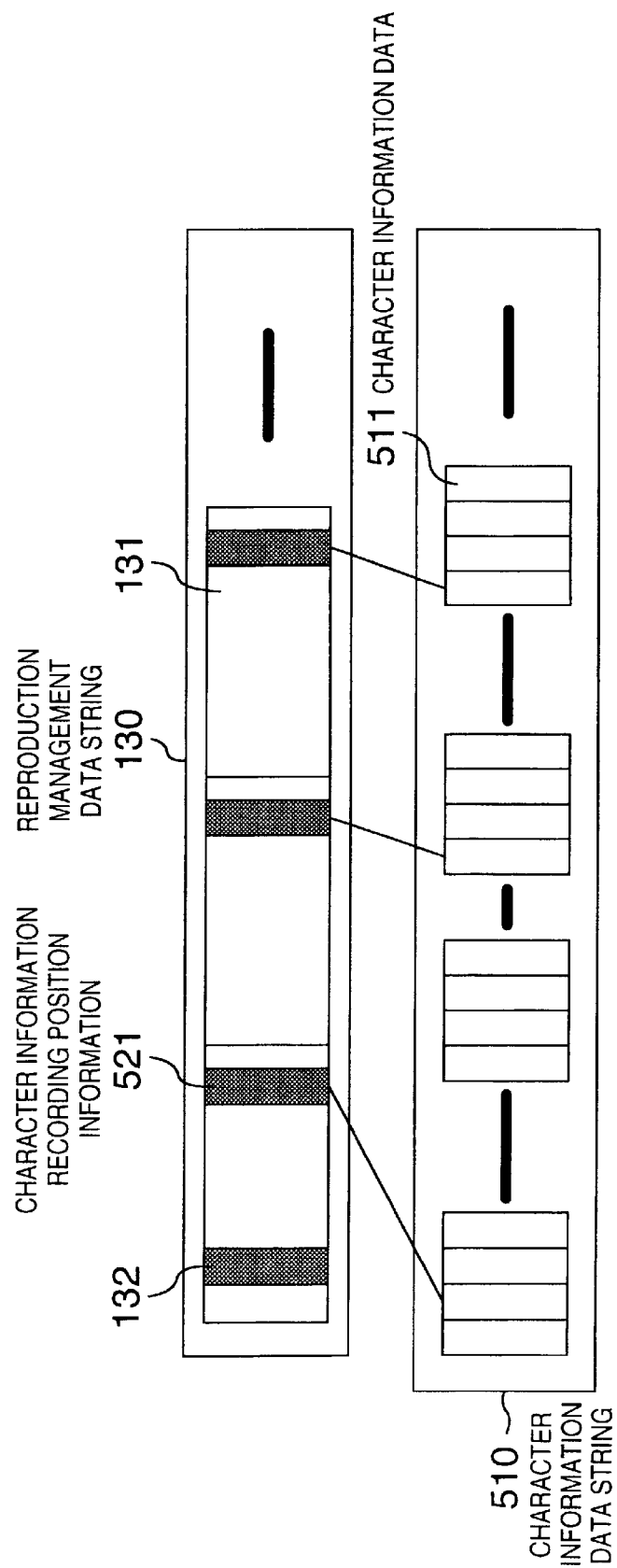
FIG. 5 shows a structure of character information data recorded to a recording medium by the motion-picture voice recording/reproducing apparatus according to the present invention, and a structure of management data of the character information data.

FIG. 5 shows a structure of character information data recorded by the motion-picture voice recording/reproducing apparatus of the present invention to the recording medium and a structure of management data of this character information data.

In FIG. 5, reference numeral 510 denotes a character information data string, and reference numeral 511 denotes character information data as one record unit of the character information data string.

Reference numerals 130 and 131 denote the reproduction management data string for managing the reproduction unit and one record unit of this reproduction management data string, respectively, as explained with reference to FIG. 1. Reference numeral 521 denotes character information recording position information that manages the correspondence between the reproduction unit and the character information data 511. This character information recording position information is recorded in each reproduction management data region. The motion-picture voice recording/reproducing apparatus according to the present invention specifies the range of the character information data 511 associated with the reproduction management data including 521 from this character information recording position information 521, and reads out the character information 511. It then executes decoding and reproduction, and reproduces and displays the character information associated with the reproduction unit designated by the user.

In the construction described above, the relation of correspondence between the character information recording position information and the character information data 511 may be determined by the construction that records the recording leading address and the recording size, or the construction that records the recording position information of the leading data record and the number of records. Alternatively, it is possible to employ the construction that records only the recording leading address or the recording position information of the leading data record, and to determine the relation of correspondence from the recording leading address that is recorded to the object record or the recording position information of the leading data record recorded to the object index, and from the recording leading address recorded to the next record next to the object record or the recording position information of the leading data record recorded to the next object index.

The reproduction management data string 130 may be combined with the information that identifies this data string, or with other information for recording and reproduction.

Reference numeral 521 denotes a character information index (character information recording position information) for recording information for specifying the recording position of the character information data that is used as the character information representing an additional contents associated with the reproduction unit. This embodiment assumes recording and reproduction of the title name of the reproduction unit, the date and the place of recording of the reproduction unit, the name of the person who conducts this recording, etc, as the character information, but is not particularly limited thereto. The user may freely decide and record the contents of the character information as a memorandum. Alternatively, the motion-picture voice recording/reproducing apparatus of the present invention may be set in advance so as to automatically record the content of the character information.

In this embodiment, only one character information recording position information is recorded in each reproduction management data, but a plurality of such information may be recorded, as well. The motion-picture voice recording/reproducing apparatus according to the present invention displays the character information by first specifying the character information data 511 from the character information recording position information 521, decoding this data, decoding at least one reproduction frame, and stopping the reproduction output while only this frame is kept displayed. The number of the screen of the character information displayed at this time may be only one, or a plurality of small screens of such character information may be displayed.

In the present invention, the value representing the state where the character information data to be displayed is not specified is set to the character information recording position information 521 as means for representing this state. This state includes the state under which recording of the character information is not made to the reproduction unit by the user or by the automatic mode of the motion-picture voice recording/reproducing apparatus of the present invention, the state under which the instruction to display this character information is released, and the state under which the motion-picture voice is recorded by other motion-picture voice recording apparatus not supporting this character information recording. The value is not limited so long as it is the value that cannot be used as the recording position of the character information data 511 in the character information recording position information.

An motion-picture voice recording/reproducing apparatus for recording and reproducing the character information using the recording medium, to which the content is recorded in the data structure described above, will be explained with reference to FIG. 2. FIG. 2 is a structural block diagram of the motion-picture voice recording/reproducing apparatus according to the present invention as described already. In FIG. 2, the character information signal inputted to, and processed by, the graphic processing unit 202 through the graphic input unit 201 or through the user interface unit is sent as its through-output to the graphic output unit 203. At the same time, it is recorded by the image memory 204 as buffer for waiting for compression encoding. Reference numeral 205 denotes a CODEC processing unit. It serially reads the signals from the image memory 204 at the time of compression encoding, executes the compression encoding process and records the signals after compression in the buffer memory 206 for recording. The signals so recorded in the buffer memory 206 are sent to the disk recording/reproducing unit 208 through the disk I/F 207 and are recorded in the recording medium. The signals flow in the opposite direction during extension decoding, are extended and decoded to the signals before compression, and are recorded in the image memory 204. The signals recorded in the image memory 204 are further modulated to the carrier wave signals in conformity with a predetermined standard (e.g. NTSC) by the graphic processing unit 202 and are sent to the graphic output unit 203.

Next, explanation will be given on the operation of the character information display through the user interface unit 214 under the state where the character information data for displaying the character information is not specified. Under this state, the value representing this state is recorded to the character information recording position information 521, as described above. When the motion-picture voice recording/reproducing apparatus detects this value, the character data 511 is not searched in the character information data string 510, and the character information is not displayed, either. In this instance, a screen reporting to the user that the character information display cannot be made may be displayed.

According to the present invention, the thumbnail image can be displayed even when the thumbnail image is not designated by the user or by the motion-picture voice recording/reproducing apparatus. For instance, the thumbnail image can be displayed even before it is designated by the user. The thumbnail can be displayed by conducting recording in the thumbnail index recording method of the present invention even in the media to which the motion-picture voice is recorded by recording apparatuses not having the thumbnail recording/reproducing function. Therefore, the recorded motion-picture voice can be retrieved efficiently.

When the thumbnail is not designated, the process for specifying the thumbnail image can be omitted from the next display by designating the image in the leading position of the reproduction unit as the thumbnail and the high-speed display can be made. The motion-picture voice recording/reproducing apparatus according to the present invention can display the character information even when the recording medium having the motion-picture voice recorded thereto by other recording apparatuses not having the character information recording/reproducing function is used by conducting the recording operation in accordance with the recording method of the character information recording position information of the present invention. Therefore, the motion-picture voice recording/reproducing apparatus according to the present invention can offer simply the motion-picture voice but also the character information.

When the character information data that is to be displayed as the character information is not specified, the motion-picture voice recording/reproducing apparatus according to the present invention need not deliberately retrieve the character information data string in order to confirm the presence/absence of the character information, and can therefore execute at a high speed the display to the effect that the character information does not exist.

What is claimed is:

1. An information recording medium having motion-picture and voice signals recorded as compressed motion-picture voice data thereto after an encoding compression processing, wherein recording position information of said compressed motion-picture voice data corresponding to an outline image representing the outline of said motion-picture and said voice signal is recorded, said recording position information represents also non-set information representing that said outline image is not set by a user or by a system, and said recording position information is arranged so as to be readable in correspondence to reproduction of said motion-picture and said voice signals at every predetermined unit thereof.

2. An information recording medium according to claim 1, wherein said non-set information representing that said outline image is not set is recorded to said recording position information by a value that cannot be used as the recording position information of said compressed motion-picture sound data.

3. An motion-picture voice recording/reproducing apparatus for recording motion-picture and voice signals on an information recording medium by executing an encoding compression processing for said motion-picture and said voice signals and recording thereon, and for reproducing said motion-picture and said voice signals read out from said information recording medium by executing an extension process of compressed motion-picture voice data, comprising:

means for generating an outline image by looking up recording position information of said compressed motion-picture voice data corresponding to said outline image representing an outline of said motion-picture and said voice signals; and control means for determining whether or not said recording position information is a value that cannot be used as said recording position information, and causing said outline image generation means to generate said outline image by regarding information of a recording leading position of a predetermined unit of said compressed motion-picture voice data as the recording position information of said compressed motion-picture voice data corresponding to the outline image to be generated when said value is determined as the value that cannot be used as said recording position information.

4. An motion-picture voice recording/reproducing apparatus according to claim 3, wherein said control means causes said outline image generation means to generate said outline image by regarding information at a position after passage of a predetermined time from the recording leading part of the predetermined unit of said compressed motion-picture voice data as the recording position information of said compressed motion-picture voice data corresponding to the outline image to be generated, when said recording position information is the value that cannot be used as said recording position information.

5. A motion-picture voice recording and reproducing method for recording motion-picture and voice signals on an information recording medium by conducting an encoding compression processing for said motion-picture and said voice signals, and generating and reproducing an outline image representing an outline of said motion-picture and said voice signals from said compressed motion-picture voice data read out from said information recording medium, comprising the steps of:

setting, at a time of recording, a value, that cannot be used as said recording position information, as recording position information of said compressed motion-picture voice data corresponding to an outline image representing the outline of said motion-picture and said voice signal when a user does not designate the outline image; and determining, at a time of reproduction, whether or not the recording position information of said compressed motion-picture voice data corresponding to said outline image is a value that cannot be used as said recording position information, and reading out said compressed motion-picture voice data at the recording leading position of a predetermined unit of said compressed motion-picture voice data and generating an outline image from said compressed motion-picture voice data read out when said recording position information has a value that cannot be used as said recording position information.

6. A motion-picture voice recording and reproducing method according to claim 5, wherein, when said recording position information is a value that cannot be used as said recording position information, said outline image is generated by regarding the information at a position after the passage of the predetermined time from a recording leading part of a predetermined unit of said compressed motion-picture voice data as recording position information of said compressed motion-picture voice data corresponding to said outline image to be generated.

7. An information recording medium for recording motion-picture and voice signals after an encoding compression processing, wherein recording position information of character information representing additional contents relating to said motion-picture and said voice signals is recorded as character information recording position information to said information recording medium, said character information recording position information functions also as non-set information representing that said character information is not set by a user or by a system, and said character information recording position information are arranged so as to be readable in correspondence to reproduction of said motion-picture and said voice signals at every predetermined unit thereof.

8. An information recording medium according to claim 7, wherein said non-set information of said character information recording position information is recorded by a value that cannot be used as said character information recording position information.

9. An motion-picture voice recording/reproducing apparatus for recording motion-picture and voice signals on an information recording medium by conducting an encoding compression processing of said motion-picture and said voice signals, and reproducing said motion-picture and said voice signals by conducting an extension processing for the compressed motion-picture voice data read out from said information recording medium, comprising:

character information generation means for reading out and generating said character information by looking up character information recording position information as recording position information of character information representing additional contents relating to said motion-picture and said voice signals; and control means for determining whether or not said character information recording position information is a value that can be used as recording position information, and executing control in such a fashion as not to look for nor to read out said character information when said character information recording position information is determined to be the value that cannot be used as said recording position information.

10. A motion-picture and voice recording and reproducing method for recording motion-picture and voice signals on an information recording medium by conducting an encoding compression processing for said motion-picture and said voice signals, and generating and reproducing character information representing additional contents relating to said motion-picture and said voice signals from the compressed motion-picture voice data read out from said information recording medium, comprising the steps of:

setting, at a time of recording, a value that cannot be used as character information recording position information, as recording position information of character information representing additional contents relating to said motion-picture and said voice signals, when a user dos not designate the character information; and determining, at a time of reproduction, whether or not said character information recording position information is a value that cannot be used as said character information recording position information, and controlling reproduction so as not to look for nor to read said character information when it is determined that said character information recording position information is the value that cannot be used as said character information recording position information.

* * * * *